US006591323B2

United States Patent
Yu

(12) United States Patent
(10) Patent No.: US 6,591,323 B2
(45) Date of Patent: *Jul. 8, 2003

(54) MEMORY CONTROLLER WITH ARBITRATION AMONG SEVERAL STROBE REQUESTS

(75) Inventor: Liang-Chien Eric Yu, San Jose, CA (US)

(73) Assignee: LSI Logic Corporation, Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/217,769

(22) Filed: Aug. 13, 2002

(65) Prior Publication Data

US 2002/0194448 A1 Dec. 19, 2002

Related U.S. Application Data

(62) Division of application No. 09/619,858, filed on Jul. 20, 2000, now Pat. No. 6,477,598.

(51) Int. Cl.⁷ .......................... G06F 13/18; G06F 13/28; G06F 13/30
(52) U.S. Cl. .......................... 710/244; 710/35; 710/40; 710/53; 710/241; 710/240; 365/189.01; 365/189.04; 365/189.05; 365/189.07; 365/203; 365/193; 365/205; 365/222; 365/230.08; 711/5; 711/158
(58) Field of Search .......................... 365/189.01, 189.04, 365/189.05, 189.07, 203, 205, 222, 230.08, 193; 710/35, 40, 44, 241, 244, 240, 53; 711/5, 158

(56) References Cited

U.S. PATENT DOCUMENTS

| | | | | |
|---|---|---|---|---|
| 4,339,808 A | * | 7/1982 | North .......................... 710/244 |
| 4,636,986 A | * | 1/1987 | Pinkham .......................... 365/195 |
| 4,958,322 A | | 9/1990 | Kosugi et al. .......... 365/189.01 |
| 4,973,969 A | * | 11/1990 | Jenson .......................... 342/189 |
| 4,987,529 A | * | 1/1991 | Craft et al. .......................... 710/113 |
| 5,329,629 A | | 7/1994 | Horst et al. .......................... 365/238.5 |
| 5,448,742 A | * | 9/1995 | Bhattacharya .......................... 711/154 |
| 5,557,578 A | * | 9/1996 | Kelly .......................... 365/222 |
| 5,623,638 A | | 4/1997 | Andrade .......................... 711/105 |
| 5,715,203 A | * | 2/1998 | Uchida .......................... 365/203 |
| 5,740,381 A | * | 4/1998 | Yen .......................... 710/113 |
| 5,745,913 A | | 4/1998 | Pattin et al. .......................... 711/105 |
| 5,920,885 A | * | 7/1999 | Rao .......................... 365/193 |
| 5,960,468 A | * | 9/1999 | Paluch .......................... 711/219 |
| RE36,532 E | * | 1/2000 | Kim .......................... 365/203 |
| 6,026,464 A | | 2/2000 | Cohen .......................... 711/5 |
| 6,058,451 A | | 5/2000 | Bermingham et al. ...... 365/222 |
| 6,282,603 B1 | | 8/2001 | Rao .......................... 365/203 |
| 6,477,598 B1 | * | 11/2002 | Yu .......................... 710/240 |

* cited by examiner

Primary Examiner—B. James Peikari
(74) Attorney, Agent, or Firm—Christopher P. Maiorana PC

(57) ABSTRACT

A controller for a memory partitioned into a plurality of banks and divided into addresses that are accessed by a plurality of row access strobe signals and a plurality of column access strobe signals. The controller generally comprising a queue state machine, a plurality of transaction state machines and an arbitor. The queue snare machine may be configured to allocate a plurality of memory commands received by the controller among a plurality transaction state machines. A first of the transaction state machines may be configured to issue a first strobe request to assert one among the row access strobe signals and the column access strobe signals in response to receiving a first of the memory commands. A second of the transaction state machines may be configured to issue a second strobe request to assert one among the row access strobe signals and the column access strobe signals in response to receiving a second of the memory commands. The arbitor may be configured to arbitrate between the first strobe request and the second strobe request.

20 Claims, 4 Drawing Sheets

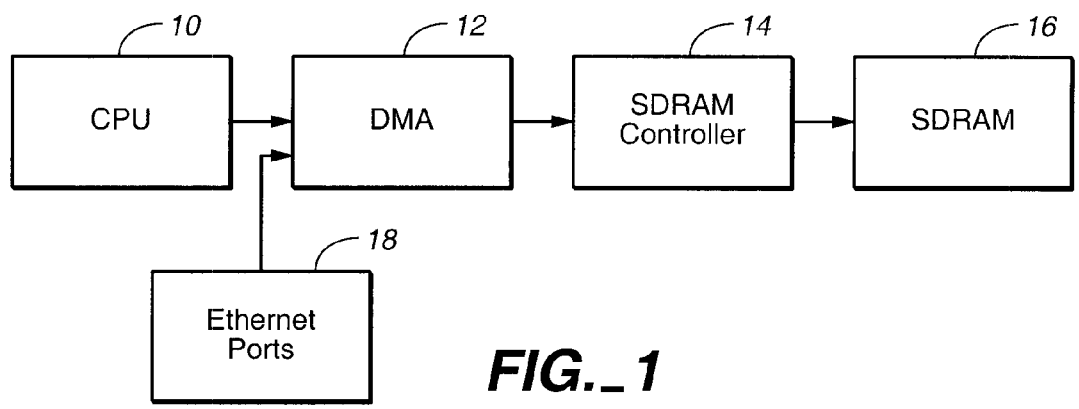
FIG._1
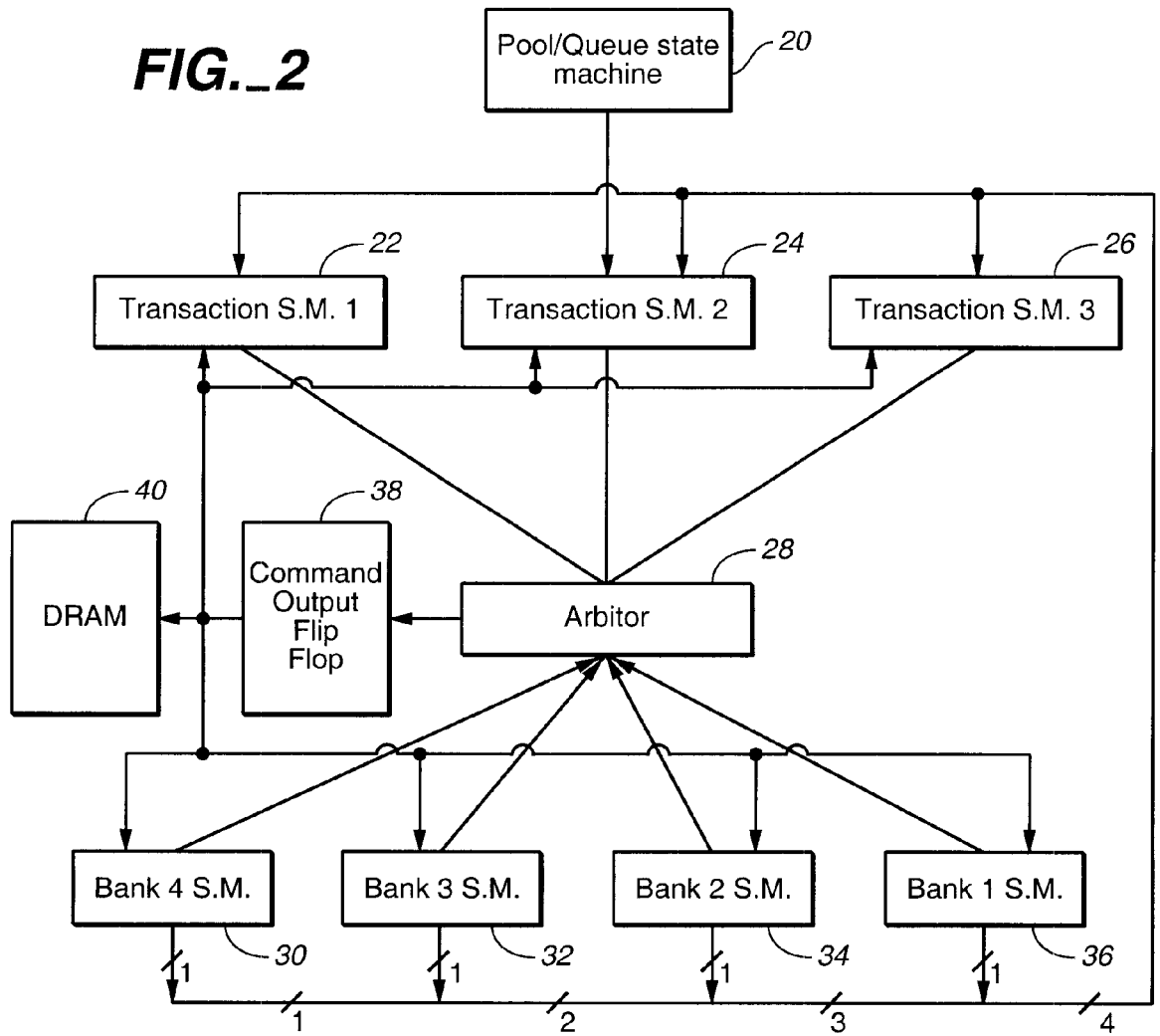
FIG._2

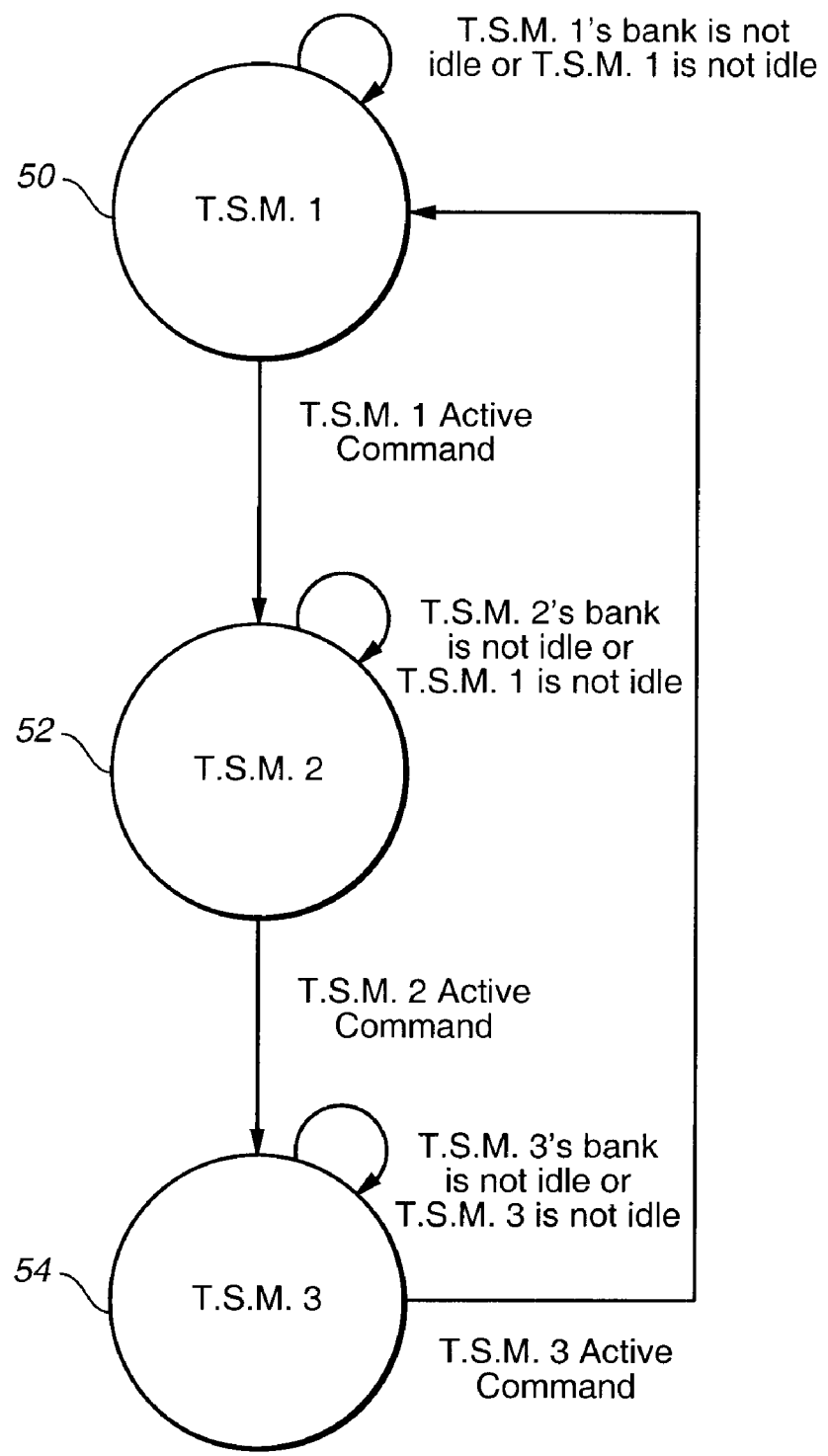
FIG._3

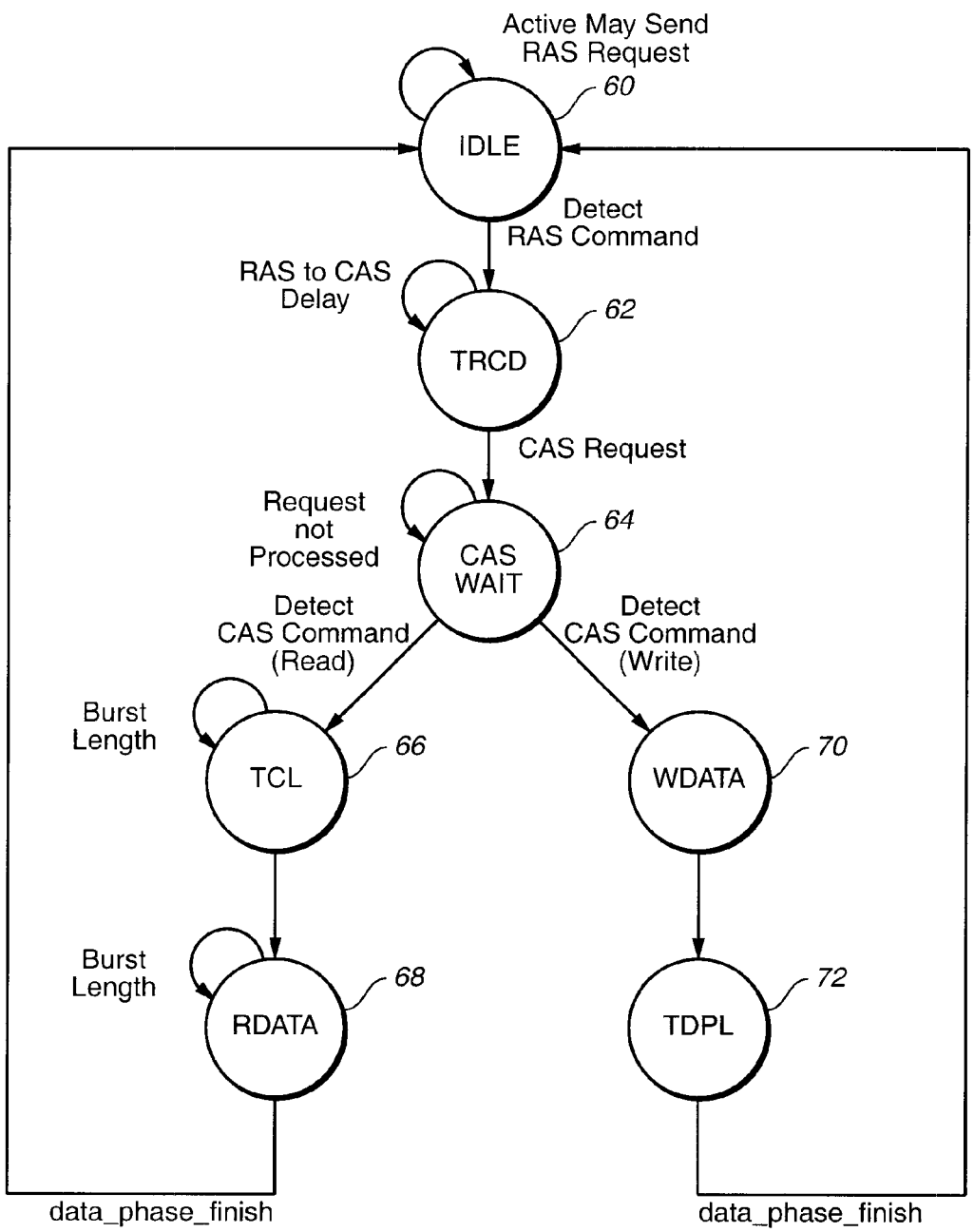
FIG._4

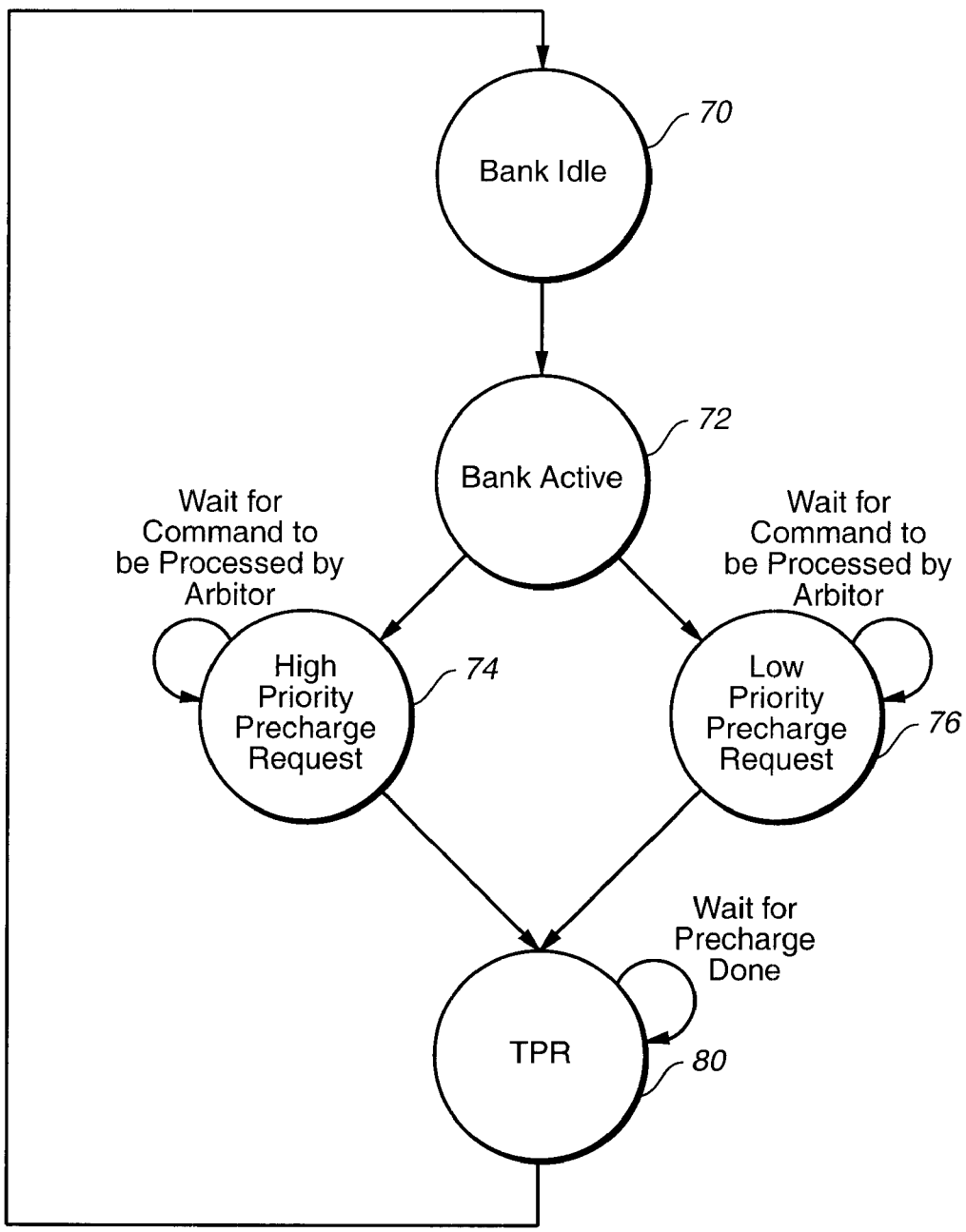
FIG._5

MEMORY CONTROLLER WITH ARBITRATION AMONG SEVERAL STROBE REQUESTS

This is a divisional of U.S. Ser. No. 09/619,858, filed Jul. 20, 2000, now U.S. Pat. No. 6,477,598.

FIELD OF THE INVENTION

This invention relates to digital memory controllers generally and, more particularly, to a memory controller with interacting state machines.

DESCRIPTION OF THE RELATED ART

Dynamic Random Access Memory (DRAM) is the most common type of electronic memory deployed in computer systems. DRAMS are often organized into a plurality of memory banks. See, for example, the data sheet for the MT48LC2M32B2 product available from Micron Technology, Inc. of Boise Id., which is herein incorporated by reference.

Many DRAMS have multiple banks that share row addresses. While one memory bank is in the second half of its read cycle for a particular column, another memory bank may simultaneously be in the first half of its read cycle for any address within that same row. If the memories across a row are sequentially accessed, which occurs in burst mode, then the multiple memory bank scheme saves time because RAS precharge delays and strobing delays are overlapped for the memory access to a bank that is accessed after another bank, as in the above example.

Memory controllers must manage access to the multiple banks. Conventional approaches allocate one state machine to each bank within the memory, where the state machine dictates the next action to be taken based upon the current state of the memory bank and input provided to the state machine, such as the result of a previous action. For example, if the current state of the state machine is that a row is active and the input row address to the state machine is that the row is the proper one, then the state machine may dictate that a CAS (column strobe) signal be applied without row strobe (RAS).

Allocating one state machine to each memory bank may result in a relatively high complexity and gate count. Further, such approaches do not scale to memories with numerous banks. It would be desirable to have a memory controller that requires relatively fewer gates, could scale to larger bank counts, and provides overlapping of the multiple memory transactions.

SUMMARY OF THE INVENTION

A memory controller for controlling a multiple bank DRAM comprises a pool/queue state machine, a plurality of transaction processor state machines, a command arbitrator and a plurality of bank state machines, preferably with one bank state machine for each bank in the DRAM.

As transactions are received by the controller, they are allocated by the pool/queue state machine to one of the transaction processor state machines. Assuming one of the transaction processor state machines has accepted the transaction, that transaction processor state machine stores the address information and burst length (assuming the memory supports bursty read/writes) of the read/write request. The receiving transaction processor state machine first checks if the memory bank corresponding to the read/write address is available. What is meant by available will be further described below. This check is performed by polling the pertinent bank state machine; each of the transaction processor state machines is coupled to each of the bank state machines, which indicate whether their corresponding banks are available.

Once the bank is available, the transaction processor state machine then sends a RAS (row access strobe) request to the arbitor. The arbitor receives this request and arbitrates between it and other pending requests (both CAS and RAS requests from the other transaction processor state machines and precharge requests from the bank state machines).

Each of the transaction processor state machines is coupled to the arbitor output. When a transaction processor state machine detects that its RAS request has appeared on the arbitor output, it then provides a CAS request to the arbitor. Each of the bank state machines is coupled to the arbitor output. When the bank state machine corresponding to the bank activated by a particular RAS command detects that RAS command on the arbitor output, it becomes active, and eventually issues a precharge command to the arbitor.

BRIEF DESCRIPTION OF THE DRAWINGS

Other objects and advantages of the invention will become apparent upon reading the following detailed description and upon reference to the accompanying drawings in which:

FIG. 1 is a diagram of a computer system including a memory;

FIG. 2 is a block diagram of the salient features of a memory controller constructed according to the present invention;

FIG. 3 is a diagram for a pool/queue state machine shown in FIG. 2;

FIG. 4 is a diagram for any of the transaction processor state machines shown in FIG. 2; and FIG. 5 is a state machine diagram for any of the bank state machines shown in FIG. 2.

While the invention is susceptible to various modifications and alternative forms, specific embodiments thereof are shown by way of example in the drawings and will herein be described in detail. It should be understood, however, that the drawings and detailed description there are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 is a diagram of a computer system including a memory. As shown, the system comprises a DRAM 16 which is coupled to a memory controller 14 through a bus. A DMA 12 device receives read/write requests from devices such as a CPU 10 or a plurality of ethernet ports 18. The DMA 12 arbitrates these requests and provides information regarding a selected request to the controller. As will be further described below, the controller is responsible for providing appropriate signals to the DRAM 16 to enable a read/write to occur. According to the preferred embodiment, the DRAM 16 is a synchronous DRAM 16 (SDRAM 16) such as the MT48LC2M32B2 product available from Micron Technology, Inc. of Boise Id. SDRAM have a burst mode according to which a particular wordline (row) is kept high during successive clock cycles and multiple bitlines (columns) are read out in those clock cycles.

FIG. 2 is a block diagram of the salient features of the controller 14. As shown, the controller 14 comprises a pool/queue state machine 20, a plurality of transaction processor state machines 22, 24 and 26, a command arbitor 28 and a plurality of bank state machines 30, 32, 34 and 36, preferably one bank state machine for each bank in the DRAM 16. Three transaction processor state machines are used in the preferred embodiment but other numbers of transaction processor state machines may be optimal depending on hardware constraints, latency considerations, etc. A plurality of timers is also in communication with the transaction processor state machines and bank state machines.

The following is an outline of the operation of the major components in FIG. 2. The operations of the transaction processor state machines 22, 24 and 26 and bank state machines 30, 32, 34 and 36 will be described more specifically with respect to FIGS. 4, 5 and 6.

As transactions are received, they are allocated by the pool/queue state machine 20 to one of the transaction processor state machines 22, 24 or 26. If all of the transaction processor state machines are busy, the controller 14 sends the DMA 12 an appropriate signal indicating that the DMA 12's request is not going to be fulfilled; the DMA 12 or requesting device must then retry the transaction at a later time if the transaction is to be processed.

Assuming one of the transaction processor state machines 22, 24 or 26, has accepted the transaction, that transaction processor state machine stores the address information and burst length (assuming the memory supports burst read/writes) of the read/write request. The receiving transaction processor state machine (assumed to be transaction processor state machine 22 for the sake of picking one as an example) first checks if the memory bank corresponding to the read/write address is available. What is meant by available will be further described below. This check is performed by polling the pertinent bank state machine 30, 32, 34 or 36; each of the transaction processor state machines 22, 24 and 26 is coupled to each of the bank state machines 30, 32, 34 and 36, which indicate whether their corresponding banks are available. Only one such connection is shown in FIG. 2 for the purpose of clarity.

Once the bank is available, the transaction processor state machine 22 then sends a RAS (row access strobe) request to the arbitor 28. The arbitor 28 receives this request and arbitrates between it and other pending requests (both CAS and RAS requests from the other transaction processor state machines and precharge requests from the bank state machines). In the preferred embodiment, the arbitor 28 has the following priority scheme: (1) high priority precharge (discussed further below); (2) CAS; (3) low priority precharge (discussed further below); and (4) RAS.

Each of the transaction processor state machines 22, 24 and 26 is coupled to the arbitor 28 output through flip flop 38. Hereafter, references will be made to data appearing on the arbitor 28 output. In the particular embodiment shown in FIG. 2, it will be appreciated that the data is actually detected on the flip flop 38 output. Continuing with the above example, when transaction processor state machine detects that its RAS command has appeared on the arbitor 28 output, it then provides a CAS request to the arbitor 28. Each of the bank state machines is coupled to the arbitor 28 output. When the bank state machine corresponding to the bank detects that RAS command on the arbitor 28 output, it becomes active. Again continuing with the above example, assume the transaction was a read or write to memory bank 1. In this case, the bank state machine 36 would become active, and eventually issue a precharge request to the arbitor 28, as will be further described below.

FIG. 3 is a possible timing diagram for the exemplary sequence discussed above.

FIG. 3 is a diagram for the pool/queue state machine 20. The pool/queue state machine 20 comprises three states, each of which corresponds to one of the transaction processor state machines 22, 24 and 26. The pool/queue state machine 20 allocates read/write requests to the transaction processor state machines 22, 24 and 26 in a round robin fashion. It will be appreciated that other allocation methods may be used.

For the sake of providing an example, it is assumed that the pool/queue state machine 20 starts in state 50 and receives a read/write command. In state 50, the pool/queue state machine 20 determines whether transaction processor state machine 22 is idle (i.e., whether it can accept a new read/write request) and, if it is idle, whether the bank state machine corresponding to the bank to be accessed by the read/write request is idle (i.e., whether that bank has been precharged, as will be further described below). If both these conditions are met, the pool/queue state machine 20 stores the read/write parameters (i.e., row address, column address, burst length, or byte mask for a partial word write) and sends an activate signal to the transaction processor state machine 22 (which will access the stored parameters, as will be further described below) and the bank state machine corresponding to the bank that will be accessed by the read/write command. The pool/queue state machine 20 then transitions to state 52.

If the transaction processor state machine 22 is not idle (i.e., is busy) or the bank state machine corresponding to the bank to be accessed by the read/write request is not idle, the pool/queue state machine 20 sends a busy signal to the DMA 12 device and stays in state 50.

States 52 and 54 operate the same as state 50, except they correspond to transaction processor state machines 24 and 26, respectively.

FIG. 4 is a diagram for any of the transaction processor state machines 22, 24 and 26, assumed to be the transaction processor state machine 22 for the purpose providing an example. The transaction processor state machine 22 waits in an idle state 60 until it receives an activate command from the pool/queue state machine 20, as previously described. If the command is a read command, and the transaction processor state machine 22 detects the RAS command from the arbitor 28 output, a transition is made to state 62. It stays in state 62 for the duration of the RAS to CAS delay (which is a parameter of the memory), after which it sends a CAS request and transitions to state 64, where it waits until it detects that the CAS command appears on the arbitor 28 output. Once it makes this detection, it transitions to state 66, where it waits for the length of the burst. After this waiting period, it sends a data_phase_finish signal to whichever of the bank state machines corresponds to the bank that was just accessed for the read. The transaction processor state machine 22 also transitions back to the idle state 60.

If the command is a write command and the transaction processor state machine 22 detects an RAS command from the arbitor 28, output 38, and the state machine transitions to state 62. It stays in state 62 for the duration of the RAS to CAS delay, after which it sends a CAS request and transitions to state 64, where it waits until it detects that the CAS command appears on the arbitor output. After this detection, the transaction processor state machine 22 transitions to state 70, where it waits for the write burst length, after which it transitions to state 72, where it waits for the write turn around time. After this waiting period, it sends a data_phase_finish signal to whichever of the bank state machines corresponds to the bank that was just accessed for the write. The transaction processor state machine 22 also transitions back to the idle state 60.

FIG. 5 is a state machine diagram for any of the bank state machine 30, 32, 34 or 36, assumed to be bank state machine 36 for the purposes of example. The bank state machine 36 stays in an idle state 71 until it receives the activate (RAS) command from one of the pool/queue state machines. Upon receiving this command, the bank state machine 36 transitions to a bank active state 73, which waits for the finish of CAS and read/write data bursts. The bank state machine 36 waits in the bank active state until it receives a data_phase_finish signal from one of the transaction processor state machines (whichever of those just handled the read/write that accessed the memory bank corresponding to the memory bank state machine 36). Upon receiving this signal, it transitions to a high priority precharge state 74 and issues a high priority precharge request to arbitrator 28 if the data burst length is less than a predetermined threshold value or it transitions to a low priority precharge state 76 and issues a low priority precharge request to arbitrator 28 if the data burst length is equal to or greater than this value. Each of the memory bank state machines has access to the read/write parameters stored by the pool/transaction processor 20 as previously described.

In the preferred embodiment, the threshold value is 8, but it will be appreciated that other values may be preferred depending on the circumstances.

A high priority or low priority precharge command is issued to the arbitrator 28 (as previously described with reference to FIG. 2) depending upon which of the states 74 or 76 the bank state machine 36 is in. In either state, the bank state machine 36 monitors the arbitrator 38 output until it detects the precharge command; the bank state machine 36 then transitions to state 80, where it waits for the precharge turn around time. After that, the bank state machine 36 transitions back to the idle state 71. That is, the bank is ready for the next read/write because it has now been precharged. The above described controller 14 is set up such that, upon initialization (i.e., the first read/write to the memory after a power on), the memory banks are all precharged.

Numerous variations and modifications will become apparent to those skilled in the art once the above disclosure is fully appreciated. It is intended that the following claims be interpreted to embrace all such variations and modifications.

What is claimed:

1. A controller for a memory partitioned into a plurality of banks and divided into addresses that are accessed by a plurality of row access strobe signals and a plurality of column access strobe signals, the controller comprising:
    a queue state machine configured to allocate a plurality of memory commands received by said controller among a plurality of transaction state machines;
    a first of said transaction state machines configured to issue a first strobe request to assert one among said row access strobe signals and said column access strobe signals in response to receiving a first of said memory commands;
    a second of said transaction state machines configured to issue a second strobe request to assert one among said row access strobe signals and said column access strobe signals in response to receiving a second of said memory commands; and
    an arbitrator configured to arbitrate between said first strobe request and said second strobe request.

2. The controller according to claim 1, further comprising:
    a plurality of bank state machines each (i) coupled to all of said transaction state machines and said arbitrator and (ii) configured to issue a precharge request to said arbitrator.

3. The controller according to claim 2, further comprising:
    a flip-flop configured to present a command generated by said arbitrator to said transaction state machines and said bank state machines.

4. The controller according to claim 3, wherein said flip-flop interfaces directly with said memory.

5. The controller according to claim 2, wherein a number of said bank state machines is equal to a number of said banks in said memory.

6. The controller according to claim 2, wherein each of said bank state machines is further configured to report whether a corresponding bank of said banks is available.

7. The controller according to claim 2, wherein said bank state machines issue said precharge requests in response to a plurality of finish signals generated by said transaction state machines.

8. The controller according to claim 2, wherein said queue state machine is further configured to send an activate signal to said first transaction state machine in response to receiving one of said memory commands while (i) said first transaction state machine is in an idle state and (ii) a corresponding one of said bank state machines is a bank idle state.

9. The controller according to claim 2, wherein each of said bank state machines remain in an idle state until receiving a row access strobe command from said arbitrator.

10. The controller according to claim 1, further comprising:
    a third of said transaction state machines coupled to said arbitrator and said queue state machine.

11. The controller according to claim 1, wherein each of said transaction state machines is further configured to receive at least one delay parameter of said memory from said queue state machine.

12. The controller according to claim 11, wherein said bank state machines have access to at least one of said delay parameters for said memory.

13. The controller according to claim 1, wherein said arbitrator arbitrates with a priority from high to low of: (1) a high priority precharge request, (2) a column access strobe request, (3) a low priority precharge request, and (4) a row access strobe request.

14. The controller according to claim 1, wherein said queue state machine is further configured to allocate said memory commands to said transaction state machines in a round robin fashion.

15. An apparatus comprising:
    means for addressing a memory using a plurality of row access strobe signals and a plurality of column access strobe signals;
    means for allocating a plurality of memory commands received by said apparatus;
    means for issuing a first strobe request to assert one among said row access strobe signals and said column access strobe signals in response to allocating a first of said memory commands;
    means for issuing a second strobe request to assert one among said row access strobe signals and said column access strobe signals in response to allocating a second of said memory commands; and means for arbitrating between said first strobe request and said second strobe request.

16. A method of operating a controller for a memory comprising the steps of:

(A) addressing said memory with a plurality of row access strobe signals and a plurality of column access strobe signals;

(B) allocating a plurality of memory commands received by said controller;

(C) issuing a first strobe request to assert one among said row access strobe signals and said column access strobe signals in response to allocating a first of said memory commands;

(D) issuing a second strobe request to assert one among said row access strobe signals and said column access strobe signals in response to allocating a second of said memory commands; and (E) arbitrating between said first strobe request and said second strobe request.

17. The method according to claim 16, further comprising the step of:

issuing a first precharge request having a high priority in response to receiving one of said memory commands having a burst length at least as great as a threshold value.

18. The method according to claim 17, further comprising the step of:

issuing a second precharge request having a low priority in response to receiving one of said memory commands having said burst length of less than said threshold value.

19. The method according to claim 18, wherein step (E) comprises the sub-step of:

arbitrating among said first strobe request, said second strobe request, said first precharge request and said second precharge request.

20. The method according to claim 16, wherein step (B) comprising the sub-step of:

activating a first state machine operation in response to (i) said first state machine operation being in an idle state and (ii) a corresponding second state machine operation being in a bank idle state.

* * * * *